US012647711B2

(12) United States Patent
Levine et al.

(10) Patent No.: US 12,647,711 B2
(45) Date of Patent: Jun. 2, 2026

(54) WIRELESS EARPIECE WITH EXTERNAL ANTENNA FEATURES AND RELATED TECHNOLOGY

(71) Applicant: NEW AUDIO LLC, New York, NY (US)

(72) Inventors: Jonathan Levine, New York, NY (US); Thomas C Wilson, New York, NY (US); Marten Wallby, New York, NY (US); Zachary Hellman, New York, NY (US); Clayton Pipkin, Highland Park, NJ (US)

(73) Assignee: NEW AUDIO LLC, New York, NY (US)

( * ) Notice: Subject to any disclaimer, the term of this patent is extended or adjusted under 35 U.S.C. 154(b) by 136 days.

(21) Appl. No.: 18/263,320

(22) PCT Filed: Jan. 27, 2022

(86) PCT No.: PCT/US2022/014097

§ 371 (c)(1),
(2) Date: Jul. 27, 2023

(87) PCT Pub. No.: WO2022/165033

PCT Pub. Date: Aug. 4, 2022

(65) Prior Publication Data

US 2024/0089646 A1 Mar. 14, 2024

Related U.S. Application Data

(60) Provisional application No. 63/142,350, filed on Jan. 27, 2021.

(51) Int. Cl.
*H04R 1/10* (2026.01)
*H01Q 1/24* (2006.01)

(52) U.S. Cl.
CPC .......... *H04R 1/1016* (2013.01); *H01Q 1/241* (2013.01); *H04R 2420/07* (2013.01)

(58) Field of Classification Search
CPC .............................. H04R 1/1016; H04R 1/241
See application file for complete search history.

(56) References Cited

U.S. PATENT DOCUMENTS 11,190,878 B1 * 11/2021 Patel .................... H04R 1/1066
2013/0342407 A1 * 12/2013 Kvist .................... H01Q 1/273
343/718

(Continued)

FOREIGN PATENT DOCUMENTS

CN 106331928 A * 1/2017 ............ H01Q 1/273
CN 206163717 U 5/2017

(Continued)

*Primary Examiner* — Sinh Tran
(74) *Attorney, Agent, or Firm* — Holzer Patel Drennan

(57) ABSTRACT

Wireless earpieces having external antenna features are described. The wireless earpiece can include a housing in which various earpiece componentry is housed. The housing includes a first major surface, a second major surface opposite the first major surface, and various peripheral side wall segments that extend around the first and second major surfaces to thereby form an enclosed housing. The entirety of an anterior portion of the peripheral side wall can serve as the antenna for the wireless earpiece. The entirety of a posterior portion of the peripheral side wall can serve as a grounding element for the wireless earpiece. The grounding element can also extend to include portions of the inferior and superior portions of the peripheral side wall.

13 Claims, 3 Drawing Sheets

(56) References Cited

U.S. PATENT DOCUMENTS

| | | | | |
|---|---|---|---|---|
| 2015/0078599 | A1* | 3/2015 | Sundberg | H01Q 1/2291 381/315 |
| 2017/0295420 | A1* | 10/2017 | Yeung | H01Q 1/273 |
| 2018/0013195 | A1* | 1/2018 | Hviid | H01Q 1/38 |
| 2018/0020277 | A1* | 1/2018 | Briggs | H01Q 9/065 |
| 2018/0048052 | A1 | 2/2018 | Jin et al. | |
| 2019/0103661 | A1* | 4/2019 | Cousins | H01Q 1/273 |
| 2019/0200112 | A1* | 6/2019 | Briggs | H04R 1/1016 |
| 2020/0021905 | A1* | 1/2020 | Briggs | H04R 1/1066 |
| 2020/0028246 | A1* | 1/2020 | Kim | H04R 1/1016 |
| 2021/0044885 | A1* | 2/2021 | Fukahori | H01Q 1/273 |
| 2021/0391644 | A1* | 12/2021 | Kawamura | H01Q 9/42 |
| 2022/0014834 | A1* | 1/2022 | Au | A61B 5/6817 |
| 2023/0328466 | A1* | 10/2023 | Hasani | H01Q 1/273 381/323 |

FOREIGN PATENT DOCUMENTS

| | | | |
|---|---|---|---|
| CN | 206402275 | U | 8/2017 |
| KR | 20110029227 | A | 3/2011 |

* cited by examiner

WIRELESS EARPIECE WITH EXTERNAL ANTENNA FEATURES AND RELATED TECHNOLOGY

TECHNICAL FIELD

The present application relates to wireless earpieces having external antenna features, and more specifically, to a wireless earpiece wherein at least the entirety of a peripheral external side wall of an earpiece housing serves as the antenna for the earpiece.

BACKGROUND

Wearable audio devices typically include an earpiece configured to be worn at a user's ear. The earpiece can include a speaker that converts an audio signal into sound. Because the sound is generated near a user's ear drum, the sound may be fully audible to the user while still being inaudible or minimally audible to others around the user. For this reason, wearable audio devices tend to be well-suited for use in public settings. Some wearable audio devices include one or two ear-supported earpieces. Examples of ear-supported earpieces include earpieces including earbuds shaped to extend into a user's ear canal and earpieces including hooks shaped to extend over a user's auricle. Other wearable audio devices include one or two head-supported earpieces. Examples of head-supported earpieces include earpieces at opposite respective ends of a headpiece shaped to bridge a user's head. Ear-supported and head-supported earpieces can be wired or wireless. Wired earpieces receive audio content from an audio player via a wire. Wireless earpieces receive audio content from an audio player via Bluetooth or a similar wireless communication standard. In a wearable audio device including a wireless earpiece, the earpiece may still be connected to another earpiece or to a control element via a wire.

In order for wireless earpieces to receive wireless communication, they generally require an antenna. In many wireless earpieces, the antenna is incorporated into the housing of the earpiece to help minimize the size of the earpiece. Many different factors impact that performance of an antenna incorporated into a wireless earpiece. As such, antenna design in wireless earpieces is generally focused on factors such as shielding the antenna from internal and external interference, maximizing antenna performance, and avoiding the attenuation of signals received by the wireless earpiece. Many of these factors are interdependent, meaning that changing the design of a wireless earpiece antenna to try to improve one factor may adversely impact another factor. For example, some previously known wireless earpiece antenna have been designed to be partially (but not fully) embedded within the wireless earpiece housing. An aim of this design is to move the antenna to a location where it is partially shielded from both internal and external sources of interference. However, in order to partially embed the antenna in this manner, the overall size of the antenna needs to be reduced, which can lower antenna performance.

Accordingly, a need exists for a wireless earpiece antenna that is designed to maximize antenna performance while minimizing or eliminating design features that may negatively impact antenna performance.

SUMMARY

The present application relates to wireless earpieces having external antenna features for improved antenna reception and performance, reduced interference from sources internal to the earpiece, reduced signal attenuation, and/or improved grounding stabilization.

In some embodiments, the wireless earpiece described herein generally includes a housing in which various earpiece componentry (e.g., circuitry, speaker, etc.) is located. The housing generally includes a first major surface, a second major surface opposite the first major surface, and one or more peripheral side wall segments extending between the first major surface and second major surface so as to thereby form a substantially enclosed space within the housing. In some embodiments, the entirety of one peripheral side wall segment serves as the earpiece antenna, and has extending from its internal surface (i.e., into the housing) one or more pins for connecting the antenna to the circuitry located within the housing. In some embodiments, the peripheral side wall serving as the antenna is at least the entirety of the peripheral side wall oriented substantially vertically and closest to the user's face when the earpiece is positioned in the user's ear (also referred to herein as the anterior peripheral side wall segment).

The housing of the wireless earpiece described herein may also include a portion of the peripheral side wall that serves as a grounding element. A plurality of grounding pins may extend from the internal surface of the grounding element and connect with the circuitry located within the housing. In some embodiments, the portion of the peripheral side wall serving as the grounding element is at least the entirety of the peripheral side wall at the posterior side of the housing and a majority of peripheral side wall at both the superior and inferior side of the housing.

BRIEF DESCRIPTION OF THE DRAWINGS

Many aspects of the present technology can be better understood with reference to the following drawings. The components in the drawings are not necessarily to scale. Instead, emphasis is placed on illustrating clearly the principles of the present technology. For ease of reference, throughout this disclosure identical reference numbers may be used to identify identical, similar, or analogous components or features of more than one embodiment of the present technology.

DETAILED DESCRIPTION

Figure 1:
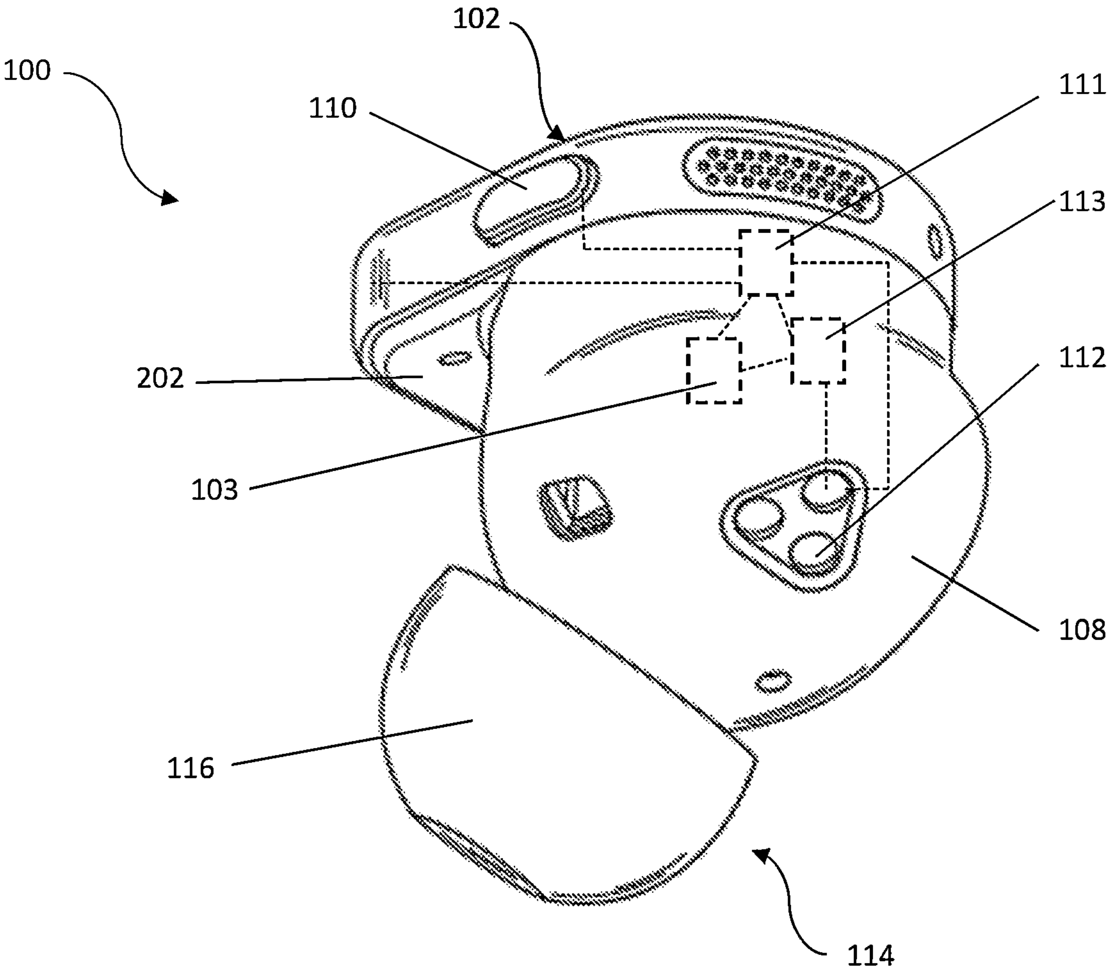
FIG. 1 is a perspective view of an earpiece in accordance with at least some embodiments of the present technology taken from above, in front of, and to the right of the earpiece.
Figure 2:
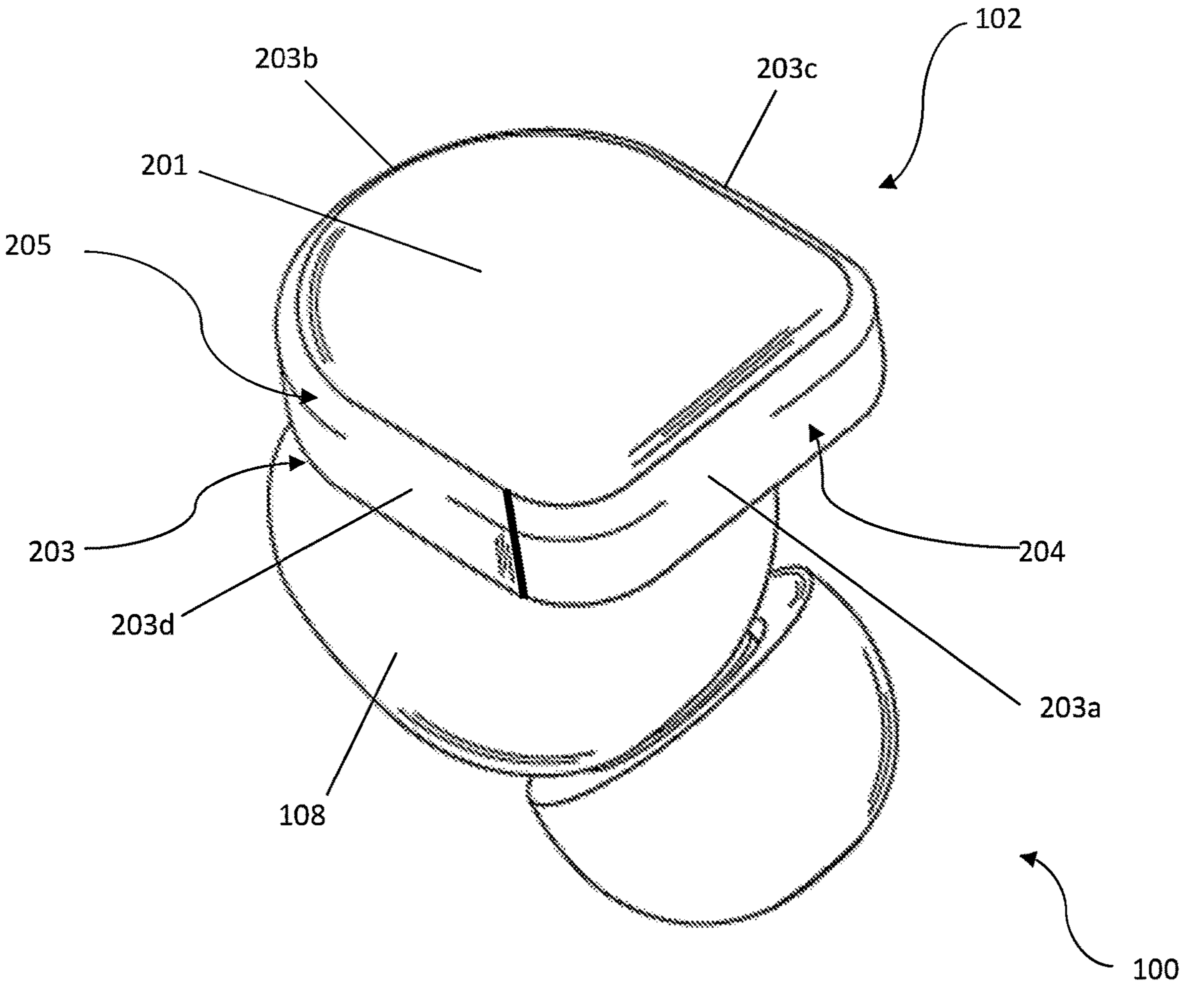
FIG. 2 is another perspective view of the earpiece shown in FIG. 1.
Figure 3:
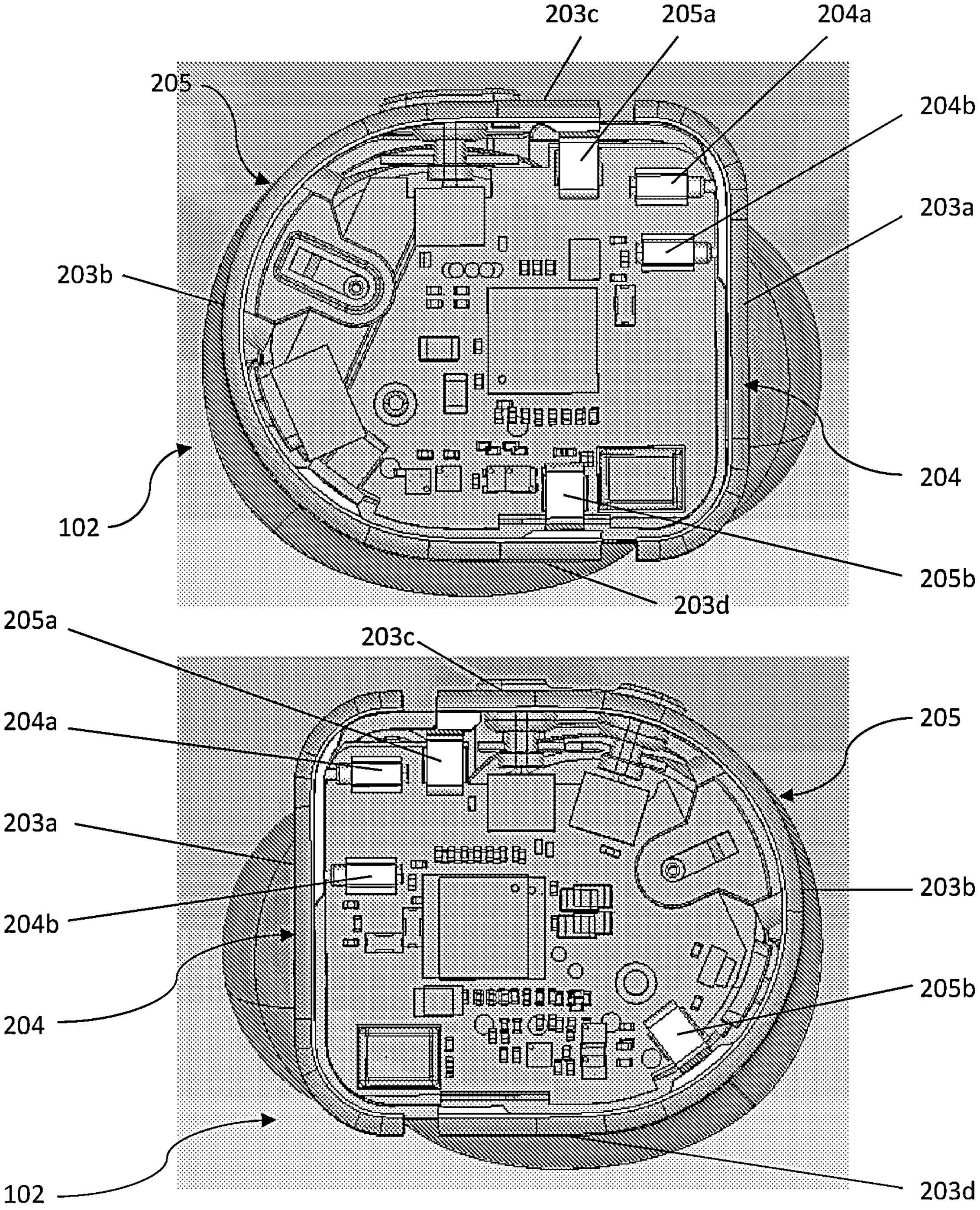
FIG. 3 is a cross-sectional view of the earpiece of FIG. 1.

Specific details of wearable audio devices and related devices, systems, and methods in accordance with several embodiments of the present technology are described herein with reference to FIGS. 1-3. Although wearable audio devices and related devices, systems, and methods may be disclosed herein primarily or entirely in the context of ear-supported earpieces, other types of earpieces are also within the scope of the present technology. For example, suitable features of described ear-supported earpieces can be implemented in the context of head-supported earpieces. Furthermore, it should be understood in general that other devices, systems, and methods in addition to those disclosed herein are within the scope of the present technology. For example, devices, systems, and methods in accordance with embodiments of the present technology can have different and/or additional configurations, components, and operations than those disclosed herein. Moreover, a person of ordinary skill in the art will understand that devices, systems, and methods in accordance with embodiments of the present technology can be without one or more of the configurations, components, and operations disclosed herein without deviating from the present technology.

FIG. 1 is a perspective view of an earpiece 100 in accordance with at least some embodiments of the present technology. As shown in FIG. 1, the earpiece 100 can include a housing 102 and a speaker 103 (shown schematically) within the housing 102. Extending from the housing 102 can be a second portion 108. At the housing 102, the earpiece 100 can include a button 110 operably connected to processing circuitry 111 (shown schematically) within the housing 102. The button 110 can be operable to turn the earpiece 100 on or off, to change a volume of sound from the speaker 103 within the housing 102, and/or to cause another change in operation of the audio device 100. At the second portion 108, the earpiece 100 can include charging pins 112 (one labeled) also operably connected to the processing circuitry 111. The earpiece 100 can also include a battery 113 (shown schematically) within the housing 102. The battery 113 can be operably connected to the speaker 103, the processing circuitry 111, and the charging pins 112.

The processing circuitry 111 included within the housing 102 can be any suitable circuitry required for operation and functioning of the earpiece 100. In some embodiments, the circuitry 111 is supported by a rigid circuit board (not shown). The processing circuitry 111 is configured to receive audio content via an antenna 204 (FIG. 2 and discussed in greater detail below) over one or more short-range RF bands. The processing circuitry 111 can also be configured to generate sound corresponding to the audio content via the speaker 103 within the housing 102. Audio content can travel within the earpiece 100 from the antenna 204 to the circuit board without travelling through any flexible wires. The circuit board can include antenna contacts through which the antenna 204 is electrically connected to the processing circuitry 111. The earpiece 100 can include angled plates electrically connecting terminals of antenna 204 and the circuit board via antenna contacts. The angled plates can be resilient and either fixedly connected to the antenna 204 and resiliently pressed against the antenna contact or fixedly connected to the antenna contact and resiliently pressed against the antenna 204.

The earpiece 100 can further include an earbud 114. The earbud 114 can be positioned to extend outwardly from the second portion 108 toward a canal of a user's ear when the earpiece 100 is mounted to the user's ear. For example, the earbud 114 can include a rigid stem (not shown) extending outwardly from the second portion 108. The earbud 114 can also include a removable cushion 116 extending circumferentially around the stem. The cushion 116 can be shaped to be snugly received within a canal of a user's ear when the earpiece 100 is mounted to the user's ear.

Based on the configuration of earpiece 100 described above and as shown in FIG. 1, the earpiece is generally configured to be worn in a user's ear, such as at least partially received within a concha of a user's ear and with the earbud 114 at least partially disposed in the ear canal.

With reference now to FIGS. 1 and 2, the housing 102 generally includes a first major surface 201 and a second major surface 202 opposite the first major surface 201. When the earbud 100 is positioned in a user's ear, the first major surface 201 generally faces away from the user's head, while the second major surface 202 faces towards the user's head. Furthermore, the second portion 108 extends from the second major surface 202. Extending between the first major surface 201 and second major surface 202 is a peripheral side wall 203 that may be made up of one or more segments depending on the overall shape of the housing 102. In FIGS. 1 and 2, the housing 102 has a generally square shape, with one rounded side. Thus, peripheral side wall 203 can be considered as having first peripheral side wall segment 203*a*, second peripheral side wall segment 203*b*, third peripheral side wall segment 203*c*, and fourth peripheral side wall segment 203*d*. When earpiece 100 is mounted in a user's ear, the first peripheral side wall segment 203*a* can also be considered the anterior peripheral side wall segment (closest to the user's face), the second peripheral side wall segment 203*b* can also be considered the posterior peripheral side wall segment (closest to the back of the user's head and opposite the anterior peripheral side wall segment), the third peripheral side wall segment 203*c* can be also be considered the superior peripheral side wall segment (closest to the top of the user's head) and the fourth peripheral side wall segment 203*d* can also be considered the inferior peripheral side wall segment (closest to the user's shoulders).

The peripheral side wall segments 203*a-d* extend around the entire periphery of the housing 102 such that, combined with the first major surface 201 and the second major surface 202, the peripheral side wall 203 forms a substantially enclosed space within the housing and in which various earpiece componentry (e.g., speaker 103, circuitry 111, battery 113) can be located.

With reference now to FIGS. 1, 2 and 3, at least the entirety of the anterior peripheral side wall portion 203*a* may serve as the antenna 204 of the earpiece 100. As shown in, e.g., FIGS. 2 and 3, because the antenna 204 is at least the entirety of the anterior peripheral side wall portion 203*a*, the antenna 204 extends the entire width of the earpiece 100 (i.e., from first major surface 201 to second major surface 202) and extends the entire height of the earpiece 100 (i.e., from the superior peripheral side wall portion 203*c* to the inferior peripheral side wall portion 203*d*). In some embodiments, the antenna 204 may even extend beyond anterior peripheral side wall portion 203*a*, such as shown in FIGS. 2 and 3, wherein a small portion of the superior peripheral side wall portion 203*c* and the inferior peripheral side wall portion 203*d* closest to the anterior peripheral side wall portion 203*a* are included as part of the antenna 204.

As also shown in, e.g., FIGS. 2 and 3, the thickness of the antenna 204 extends the entire thickness of the anterior peripheral side wall portion 203*a*, such that the external surface of the antenna 204 is the external surface the housing 102 at the anterior peripheral side wall portion 203*a*. This configuration, wherein the antenna 204 makes up a relatively large portion of the housing 102 and is located at the external surface of the housing 102 provides various benefits to the earpiece 100. For example, the relatively large size of the antenna 204 improves antenna performance, especially as compared to similar earpieces with smaller antennas (e.g., an antenna that is less than the full width of the peripheral side portion where it is located and/or less than the full length of the peripheral side portion where is located). Similarly, the location of the antenna 204 at an external surface of the housing 102 makes it easier for the antenna 204 to receive external signals and distances the antenna 204 from sources of internal interference (especially as compared to antennas that are fully or partially embedded within a similar earpiece housing).

As shown in FIG. 3, the antenna 204 may include various pins extending inwardly into the housing 102 from an internal surface of the antenna 204. In FIG. 3, the antenna 204 includes two such pins 204*a* and 204*b*, though it should be appreciated that additional pins may be provided. Pin 204*a* may be a feed pin communicatively coupling the antenna 204 to the circuitry 111 within the housing 102. Pin 204*b* may be a ground pin aimed at improving the grounding characteristics of the earpiece 100. The specific location of the pins 204*a*, 204*b* along the length of the antenna 204 is generally not limited, and may be adjusted based on, e.g., the presence and orientation of other componentry inside the housing 102.

The type and material of antenna 204 is generally not limited. Generally speaking, the material of anterior peripheral side wall segment 203*a* that serves as the antenna 204 is selected such that the material is a suitable antenna material.

The design of antenna 204 as shown in FIGS. 1, 2 and 3 provides various benefits with respect to antenna performance in a wireless earpiece device. To begin with, the location of the antenna 204 at an external position on the housing 102 means that the antenna 204 better receives external signals as compared to, for example, antennas partially or fully embedded within an earpiece housing. Additionally, the positioning of the antenna 204 at an external position on the housing 102 means that the antenna 204 is positioned far from any sources of interference located within the housing 102, further improving antenna performance. Furthermore, because the entirety of the anterior peripheral side wall segment 203*a* serves as the antenna 204, the size of the antenna 204 is greatly increased as compared to antennas partially or fully embedded in an earpiece housing. This increased size of antenna 204 improves antenna performance.

The location of the antenna 204 at the anterior peripheral side wall 203*a* of the housing 102 also helps to avoid skin contact with the antenna, which is desirable as a means to avoid signal attenuation. Antenna contact with the user's skin is avoided when the antenna 204 is positioned as described above because the antenna is retained in a relatively fixed position by virtue of its alignment with and proximity to the earbud 114. When the earpiece is worn by a user, the earbud 114 is inserted to the ear canal, and this generally immobilizes the anterior side of the housing 102 since the earbud 114 extends from the housing 102 at the anterior side of the housing. In contrast, the posterior peripheral side wall 203*b* has a much higher chance of being contacted by skin because the posterior side of housing 102 is opposite the side of housing 102 that is anchored in the ear canal. In this regard, the posterior end of the housing can be considered as "floating" in the concha since it is not directly anchored and can move around within the concha. As such, the posterior side of housing 102 is more susceptible to movement (such as when the housing 102 pivots about the ear bud 114 anchored in the ear canal) and can contact, for example, the antitragus, the antihelix, the scapha, and other portions of the ear, as well as the user's fingers.

While the location of antenna 204 as described herein has various benefits as described previously, the design of antenna 204 may also present some disadvantages that can diminish antenna performance unless additional design modifications are made. For example, while the increased size of the antenna 204 and its location at an external surface of the housing generally improve antenna performance, these features also make it more likely that the antenna 204 will be contacted by skin (regardless of its location at the anterior portion of the housing 102). Accordingly, in order to address the possible increased likelihood of the antenna 204 being contacted by skin (and the associated attenuation of signal caused by skin contact), the earpiece 100 described herein further includes a grounding element 205 aimed at providing antenna stabilization in the event of skin contact with the antenna 204.

With reference to FIGS. 2 and 3, posterior peripheral side wall portion 203*b* and portions of superior peripheral side wall portion 203*c* and inferior peripheral side wall portion 203*d* make up grounding element 205. Similar to antenna 204, at least the entirety of the posterior peripheral side wall portion 203*b* serves as the grounding element 205. The grounding element 205 extends the entire width of the earpiece 100 (i.e., from first major surface 201 to second major surface 202) and extends the entire height of the earpiece 100 (i.e., from the superior peripheral side wall portion 203*c* to the inferior peripheral side wall portion 203*d*). Additionally, the grounding element 205 extends a majority of the length of the housing 102 by virtue of portions of the superior peripheral side wall portion 203*c* and the inferior peripheral wall portion 203*d* serving as part of the ground element 205. In some embodiments, the grounding element 205 occupies greater than 50%, greater than 60%, greater than 70%, greater than 80%, or greater than 90% of the superior and inferior sides of the housing 102.

In some embodiments, the terminal ends of the grounding element 205 abut and are flush with the terminal ends of the antenna 204. As shown in the Figures, the terminal ends of the antenna 204 and the terminal ends of the grounding element 205 will generally meet on the interior and superior sides of the housing at location proximate the anterior side of the housing. In other embodiments, the terminal ends of the grounding element 205 and the terminal ends of the antenna 206 are separated by a thin gap (as shown in FIG. 3) or by a piece of material that serves to keep the two elements separated from each other.

In embodiments where the posterior side of housing 102 is curved (as shown in the Figures), this configuration gives the grounding element 205 a generally U-shape. However, it should be appreciated that other shapes for both the grounding element 205 and the antenna 204 are possible, such as when the housing 102 has a different overall shape than is shown in the Figures. For example, housing 102 may have an overall square or rectangular shape (i.e., with no rounded side at the posterior side), in which case the grounding element 205 may have a square C-shape. In another example, the rounded side of the housing 102 may be switched to the anterior side of the housing 102, such that antenna 204 has a U or semi-circle shape.

As also shown in, e.g., FIGS. 2 and 3, the thickness of the grounding element 205 extends the entire thickness of the posterior peripheral side wall portion 203*b*, the superior side wall portion 203*c* and the inferior side wall portion 203*d*, such that the external surface of the grounding element 205 is the external surface the housing 102 at the posterior, inferior and superior peripheral side wall portion 203*b*, 203*c*, 203*d*.

As shown in FIG. 3, the grounding element 205 may include various pins extending inwardly into the housing 102 from an internal surface of the grounding element 205. In FIG. 3, the grounding element 205 includes two such pins 205*a* and 205*b*, though it should be appreciated that additional pins may be provided. Both of pins 205*a* and 205*b* serves as grounding pins. As with grounding pin 204*b*, the grounding pins 205*a*, 205*b* serve to improve grounding characteristic of the earpiece 100. In some embodiments, the grounding pins 205*a*, 205*b* may be connected to a ground plane present in the circuitry 111. The specific location of the pins 205*a*, 205*b* along the length of the grounding element 205 is generally not limited, and may be adjusted based on, e.g., the presence and orientation of other componentry inside the housing 102.

The present application has generally described a single earpiece 100. However, it should be appreciated that a second earpiece (similar or identical to earpiece 100 though having a mirrored configuration) may be supplied such that the user may place an earpiece in both ears. Such a second earpiece may have some or all of the features of the earpiece 100 described herein.

FIG. 3 shows a cross-section view of both a right and left earpiece 100. As shown in these views, the location of the pins can be adjusted to accommodate other componentry located within the housing 102. The location of pins in the right earpiece may be in approximately the same location as pins in the left earpiece, or (as shown in the two views of FIG. 3), some of the pins may be located in different locations depending on whether the earpiece is a right earpiece or a left earpiece.

This disclosure is not intended to be exhaustive or to limit the present technology to the precise forms disclosed herein. Although specific embodiments are disclosed herein for illustrative purposes, various equivalent modifications are possible without deviating from the present technology, as those of ordinary skill in the relevant art will recognize. In some cases, well-known structures and functions have not been shown and/or described in detail to avoid unnecessarily obscuring the description of the embodiments of the present technology. Although steps of methods may be presented herein in a particular order, in alternative embodiments the steps may have another suitable order. Similarly, certain aspects of the present technology disclosed in the context of particular embodiments may be combined or eliminated in other embodiments. Furthermore, while advantages associated with certain embodiments may have been disclosed in the context of those embodiments, other embodiments may also exhibit such advantages, and not all embodiments need necessarily exhibit such advantages or other advantages disclosed herein to fall within the scope of the present technology.

Throughout this disclosure, the singular terms “a,” “an,” and “the” include plural referents unless the context clearly indicates otherwise. Similarly, unless the word “or” is expressly limited to mean only a single item exclusive from the other items in reference to a list of two or more items, then the use of “or” in such a list is to be interpreted as including (a) any single item in the list, (b) all of the items in the list, or (c) any combination of the items in the list. Additionally, the terms “comprising” and the like, as used throughout this disclosure, mean including at least the recited feature(s) such that any greater number of the same feature(s) and/or one or more additional types of features are not precluded. Directional terms, such as “upper,” “lower,” “front,” “back,” “vertical,” and “horizontal,” may be used herein to express and clarify the relationship between various elements. It should be understood that such terms do not denote absolute orientation. Reference herein to “one embodiment,” “an embodiment,” or similar formulations means that a particular feature, structure, operation, or characteristic described in connection with the embodiment can be included in at least one embodiment of the present technology. Thus, the appearances of such phrases or formulations herein are not necessarily all referring to the same embodiment. Furthermore, various particular features, structures, operations, or characteristics may be combined in any suitable manner in one or more embodiments of the present technology.

We claim:

1. A wireless earpiece, comprising:

a housing configured for containing therein one or more wireless earpiece components, the housing comprising:
- a first major surface;
- a second major surface opposite the first major surface; and
- two or more peripheral side wall segments, each of the peripheral side wall segments extending between the first major surface and the second major surface and, in combination, the two or more peripheral side wall segments extending around the entire periphery of the housing, to thereby form a substantially enclosed space within the housing; wherein the entirety of one of the two or more peripheral side wall segments is comprised of an earpiece antenna and the entirety of another of the two or more peripheral side wall segments is comprised of a grounding element.

2. The wireless earpiece of claim 1, wherein the earpiece antenna has extending from an internal surface thereof one or more pins configured for electrically connecting the antenna to at least one of the one or more earpiece components contained within the housing.

3. The wireless earpiece of claim 2, wherein at least one of the one or more earpiece components to which the one or more pins of the earpiece antenna is electrically connected comprises earpiece processing circuitry.

4. The wireless earpiece of claim 1, wherein the earpiece antenna that makes up the entirety of one peripheral side wall segment of the housing is oriented substantially vertically and is the closest peripheral sidewall segment of the housing to a user’s face when the wireless earpiece is positioned in the user’s ear.

5. The wireless earpiece of claim 1, wherein the grounding element has extending from an internal surface thereof one or more pins configured for electrically connecting the grounding element to at least one of the one or more earpiece components contained within the housing.

6. The wireless earpiece of claim 5, wherein the at least one of the one or more earpiece components to which the one or more pins of the grounding element is connected comprises earpiece processing circuitry.

7. The wireless earpiece of claim 1, wherein the other of the two or more peripheral sidewall segments has a curved portion, a first straight portion extending from a first end of the curved portion, and a second straight portion extending from a second end of the curved portion.

8. The wireless earpiece of claim 7, wherein the entirety of the another peripheral sidewall segment that is comprised of the grounding element includes at least all of the curved portion, at least a portion of the first straight portion, and at least a portion of second straight portion.

9. The wireless earpiece of claim 7, wherein the entirety of the another peripheral sidewall segment that is comprised of the grounding element consists of all of the curved portion, a portion of the first straight portion and a portion of the second straight portion.

10. The wireless earpiece of claim 7, wherein when the earpiece is positioned in a user’s ear, the curved portion of the another peripheral sidewall portion is located at the posterior side of the housing.

11. A wireless earpiece, comprising: a housing configured for containing therein one or more wireless earpiece components, the housing comprising:

a first major surface;

a second major surface opposite the first major surface;

an anterior peripheral sidewall extending between the first major surface and the second major surface, the anterior peripheral sidewall being the sidewall of the housing located closest to a user's ear when the wireless earpiece is positioned in the user's ear;

and a posterior peripheral sidewall extending between the first major surface and the second major surface, the posterior peripheral sidewall being the sidewall of the housing located farthest away from the user's ear when the wireless earpiece is positioned in the user's ear;

wherein the entirety of the anterior peripheral sidewall consists of an antenna and the entirety of the posterior sidewall consists of a grounding element.

12. The wireless earpiece of claim 11, wherein the housing further comprises:

a superior peripheral sidewall extending between the first major surface and the second major surface, and extending from a superior end of the anterior peripheral sidewall to a superior end of the posterior peripheral sidewall; and an inferior peripheral side wall extending between the first major surface and the second major surface, and extending from an inferior end of the anterior peripheral sidewall to an inferior end of the posterior peripheral sidewall.

13. The wireless earpiece of claim 12, wherein a portion of the superior peripheral sidewall closest to the posterior peripheral sidewall and a portion of the inferior peripheral sidewall closest to the posterior peripheral sidewall consists of the grounding element.

* * * * *